US009722820B1

(12) United States Patent
Hekmat et al.

(10) Patent No.: US 9,722,820 B1
(45) Date of Patent: Aug. 1, 2017

(54) CALIBRATION TECHNIQUE FOR A TAP VALUE IN DECISION FEEDBACK EQUALIZERS

(71) Applicant: SAMSUNG DISPLAY CO., LTD., Yongin-si, Gyeonggi-do (KR)

(72) Inventors: Mohammad Hekmat, Mountain View, CA (US); Amir Amirkhany, Sunnyvale, CA (US)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 15/194,417

(22) Filed: Jun. 27, 2016

Related U.S. Application Data

(60) Provisional application No. 62/309,883, filed on Mar. 17, 2016.

(51) Int. Cl.
H03H 7/40 (2006.01)
H04L 25/03 (2006.01)
H04B 1/16 (2006.01)

(52) U.S. Cl.
CPC ......... *H04L 25/03057* (2013.01); *H04B 1/16* (2013.01)

(58) Field of Classification Search
CPC ....... H04L 2025/0349; H04L 25/03885; H04L 2025/03579; H04L 25/14; H04L 25/03057
USPC .................. 375/233; 327/339, 530
See application file for complete search history.

(56) References Cited

U.S. PATENT DOCUMENTS 7,792,185 B2 9/2010 Bulzacchelli et al.
7,822,114 B2 10/2010 Bulzacchelli et al.
7,869,498 B2 1/2011 Zeng et al.
8,576,903 B2* 11/2013 Raphaeli ........... H04L 25/03057
327/551
9,071,481 B2 6/2015 Kaviani et al.
9,100,229 B2* 8/2015 Jing .................. H04L 25/03057
9,178,552 B1* 11/2015 Satarzadeh ....... H04L 25/03057
2008/0187037 A1* 8/2008 Bulzacchelli ........... H03K 5/02
375/233
2011/0310949 A1* 12/2011 Zerbe .................. H04L 1/0026
375/229

(Continued)

OTHER PUBLICATIONS

Hsieh, et al.; Decision Feedback Equalizers Using The Back-Gate Feedback Technique; Circuits and Systems II: Express Briefs, IEEE Transactions (vol. 58, Issue 12, pp. 897-901), Dec. 2011.

(Continued)

*Primary Examiner* — Helene Tayong
(74) *Attorney, Agent, or Firm* — Lewis Roca Rothgerber Christie LLP

(57) ABSTRACT

A method of calibrating coefficients of a calibrated decision feedback equalizer (DFE) across a process, voltage, and temperature (PVT) range, the calibrated DFE comprising a plurality of DFE taps for reducing distortions of an input signal, and a sampler for sampling the input signal, the method including applying a preset voltage to an input of the calibrated DFE, setting a DFE tap of the plurality of DFE taps to a maximum value, generating a source reference, via a source reference calibrator, to apply to the DFE tap, changing the source reference to a first level that causes an output of the sampler to transition from a first state to a second state, determining the first level as a calibrated source reference, and applying the calibrated source reference to the DFE tap during normal operation of the calibrated DFE.

20 Claims, 6 Drawing Sheets

(56) References Cited

U.S. PATENT DOCUMENTS

| | | | |
|---|---|---|---|
| 2013/0064281 A1* | 3/2013 | Raphaeli | H04L 25/03057 375/233 |
| 2013/0230093 A1* | 9/2013 | Aziz | H04L 25/03057 375/233 |
| 2015/0019770 A1 | 1/2015 | Chen et al. | |
| 2015/0049798 A1 | 2/2015 | Hossein et al. | |
| 2015/0116299 A1 | 4/2015 | Hekmat et al. | |

OTHER PUBLICATIONS

Zhang, et al.; A 6.25-gbps 4-Tap Low-Power Decision Feedback Equalizer in 0.13μm CMOS Technology; Electron Devices and Solid-State Circuits (EDSSC), 2013 IEEE International Conference, pp. 1-2, Sep. 5, 2013.

* cited by examiner

CALIBRATION TECHNIQUE FOR A TAP VALUE IN DECISION FEEDBACK EQUALIZERS

CROSS-REFERENCE TO RELATED APPLICATION(S)

This application claims priority to, and the benefit of, U.S. Provisional Application No. 62/309,883 ("A Calibration Technique for a Tap Value in Decision Feedback Equalizers"), filed on Mar. 17, 2016, the entire content of which is incorporated herein by reference.

FIELD

Aspects of the present invention relate to the field of data receivers and methods of calibrating the same.

BACKGROUND

Data bits traveling through a high-speed transmission link may experience distortions as a result of inter-symbol interference (ISI), which causes one bit of data to interfere with and distort subsequent bits in a data stream. Such distortions may lead to bit detection errors at the receiver end.

Currently, decision feedback equalizers (DFEs) are commonly used to reduce the distortion of incoming bits of a data stream prior to sampling. DFEs utilize filter taps to cancel or reduce the residue of previous bits on a current bit of a data steam. However, the range and resolution of the tap values of the DFE are affected by variations in the manufacturing process, power supply voltage, and operating temperature (PVT) of the DFE, among other factors.

Some solutions involve overdesigning the DFE to ensure proper operation under PVT corner cases, however, this increases system size, power consumption, and system cost.

The above information disclosed in this Background section is only for enhancement of understanding of the background of the invention, and therefore it may contain information that does not form the prior art that is already known to a person of ordinary skill in the art.

SUMMARY

Aspects of embodiments of the present invention are directed to a calibrated decision feedback equalizer (DFE) capable of reducing or eliminating sensitivity of DFE tap resolution and range to process, supply voltage, and temperature (PVT) variations.

Aspects of embodiments of the present invention are directed to a method of calibrating tap values of a DFE to correct for PVT variations.

According to embodiments of the present invention, there is provided a method of calibrating coefficients of a calibrated decision feedback equalizer (DFE) across a process, voltage, and temperature (PVT) range, the calibrated DFE comprising a plurality of DFE taps for reducing distortions of an input signal, and a sampler for sampling the input signal, the method including: applying a preset voltage to an input of the calibrated DFE; setting a DFE tap of the plurality of DFE taps to a maximum value; generating a source reference, via a source reference calibrator, to apply to the DFE tap; changing the source reference to a first level that causes an output of the sampler to transition from a first state to a second state; determining the first level as a calibrated source reference; and applying the calibrated source reference to the DFE tap during normal operation of the calibrated DFE.

In some embodiments, the method further includes setting all other of the plurality of DFE taps to zero.

In some embodiments, the source reference is a minimum reference current, and the changing the source reference to the first level includes incrementing a current applied to the DFE tap from the minimum reference current to the first level.

In some embodiments, the method further includes: generating a maximum reference current, via the source reference calibrator, to apply to the DFE tap; decrementing the current applied to the DFE tap from the maximum reference current to a second level that causes an output of the sampler to transition from the second state to the first state; and determining the calibrated source reference as an average of the first and second levels.

In some embodiments, the source reference is a maximum reference current, and the changing the source reference to the first level includes decrementing a current applied to the DFE tap from the maximum reference current to the first level.

In some embodiments, the method further includes: generating a maximum reference current, via the source reference calibrator, to apply to the DFE tap; incrementing the current applied to the DFE tap from the maximum reference current to a second level that causes an output of the sampler to transition from the second state to the first state; and determining the calibrated source reference as an average of the first and second levels.

In some embodiments, the preset voltage is a bandgap voltage reference that is substantially constant across a PVT range.

In some embodiments, the first and second states correspond to different binary logic states.

In some embodiments, the source reference is a minimum reference voltage, and the changing the source reference to the first level includes incrementing a voltage applied to the DFE tap from the minimum reference voltage to the first level.

In some embodiments, the source reference is a maximum reference voltage, and the changing the source reference to the first level includes decrementing a voltage applied to the DFE tap from the maximum reference voltage to the first level.

According to embodiments of the present invention, there is provided a calibrated decision feedback equalizer (DFE) including: a sampler configured to sample an input signal received by the calibrated DFE; a plurality of DFE taps configured to reduce distortions of the input signal based on an output of the sampler; a processor; and a processor memory local to the processor, wherein the processor memory has stored thereon instructions that, when executed by the processor, cause the processor to perform: applying a preset voltage to an input of the calibrated DFE; setting a DFE tap of the plurality of DFE taps to a maximum value; generating a source reference, via a source reference calibrator, to apply to the DFE tap; changing the source reference to a first level that causes an output of the sampler to transition from a first state to a second state; determining the first level as a calibrated source reference; and applying the calibrated source reference to the DFE tap during normal operation of the calibrated DFE.

In some embodiments, the instructions further cause the processor to perform setting all other of the plurality of DFE taps to zero.

In some embodiments, the source reference is a minimum reference current, and the changing the source reference to the first level includes incrementing a current applied to the DFE tap from the minimum reference current to the first level.

In some embodiments, the instructions further cause the processor to perform: generating a maximum reference current, via the source reference calibrator, to apply to the DFE tap; decrementing the current applied to the DFE tap from the maximum reference current to a second level that causes an output of the sampler to transition from the second state to the first state; and determining the calibrated source reference as an average of the first and second levels.

In some embodiments, the source reference is a maximum reference current, and the changing the source reference to the first level includes decrementing a current applied to the DFE tap from the maximum reference current to the first level.

In some embodiments, the instructions further cause the processor to perform: generating a maximum reference current, via the source reference calibrator, to apply to the DFE tap; incrementing the current applied to the DFE tap from the maximum reference current to a second level that causes an output of the sampler to transition from the second state to the first state; and determining the calibrated source reference as an average of the first and second levels.

In some embodiments, the preset voltage is a bandgap voltage reference that is substantially constant across a PVT range.

In some embodiments, the first and second states correspond to different binary logic states.

According to embodiments of the present invention, there is provided a calibrated decision feedback equalizer (DFE) including: a sampler configured to sample an input signal received by the calibrated DFE; a plurality of DFE taps configured to reduce distortions of the input signal based on an output of the sampler; a source reference calibrator configured to provide a calibrated source reference to the plurality of DFE taps to reduce sensitivity to process, supply voltage, and temperature variations at the plurality of DFE taps; a processor; and a processor memory local to the processor, wherein the processor memory has stored thereon instructions that, when executed by the processor, cause the processor to perform: applying a preset voltage to an input of the DFE; setting a DFE tap of the plurality of DFE taps to a maximum value; generating a source reference, via the source reference calibrator, to apply to the DFE tap; changing the source reference to a first level that causes an output of the sampler to transition from a first state to a second state; determining the first level as the calibrated source reference; and applying the calibrated source reference to the DFE tap during normal operation of the DFE.

In some embodiments, the source reference calibrator includes: a finite state machine configured to monitor the output of the sampler, and to generate a control signal based on the monitored output; and a current digital-to-analog converter (CDAC) configured to generate the calibrated source reference according to the control signal.

BRIEF DESCRIPTION OF THE DRAWINGS

The accompanying drawings, together with the specification, illustrate example embodiments of the present invention, and, together with the description, serve to explain the principles of the present invention.

DETAILED DESCRIPTION

Figure 1:
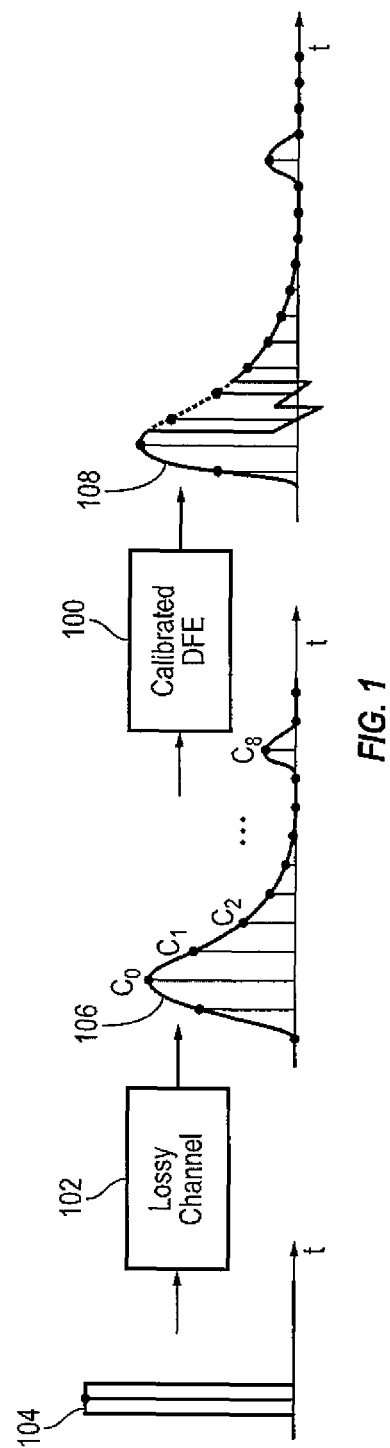
FIG. 1 is a conceptual illustration of the effect of a calibrated decision feedback equalizer (DFE) in correcting a channel response of a high-speed transmission link according to some exemplary embodiments of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Descriptions of features or aspects within each exemplary embodiment should typically be considered as available for other similar features or aspects in other exemplary embodiments. Like reference numerals designate like elements throughout the specification.

FIG. 1 illustrates the effect of a calibrated DFE 100 in correcting a channel response of a high-speed transmission link 102 according to some exemplary embodiments of the present invention.

Referring to FIG. 1, a channel response of a transmission link (e.g., a high-speed transmission link) 102 may suffer from loss and signal reflections. In such a transmission link 102, inter-symbol interference (151) may cause one bit of data to interfere with and distort (e.g., smear out and spill over to) subsequent bits. As such, a bit of data 104 transmitted through the high-speed transmission link 102 may be received as a distorted bit (i.e., the received signal) 106 that carries a residue of previous bits as shown in FIG. 1. ISI may become more prominent as transmission speeds increase and pulse widths representing data bits become correspondingly narrower. The value of the received distorted bit at each sampling point may be referred to as a tap value, for example, a main tap value $C_0$ (which corresponds to the bit data 104 sent through the transmission link 102), a first tap value $C_1$, a second tap value $C_2$, and so forth.

The calibrated decision feedback equalizer (DFE) corrects the received signal 106 at the sampling point by subtracting residues of previous bits to clean up the current bit and produces a corrected bit 108. While FIG. 1 illustrates an example in which only the first and second tap values $C_1$ and $C_2$ are corrected by the calibrated DFE 100, this is only for ease of illustration, and the present invention is not limited thereto. For example, the calibrated DFE may correct n tap values $C_1$ to $C_n$ (where n is any integer greater than 1). In some examples, the tap values $C_1$ to $C_n$ may be known parameters (resulting from knowledge about the transmission link 102) or may be adaptively determined through a feedback mechanism.

To achieve optimal correction, it is desirable for the calibrated DFE 100 to utilize the correct tap values. For example, the resolution of each of the tap values $C_1$ to $C_n$ may determine the accuracy of the ISI cancellation by the calibrated DFE 100, and the range of each of the tap values $C_1$ to $C_n$ may determine the ability of the calibrated DFE 100 to cover (e.g., not to saturate under) various extreme channel conditions of the high-speed transmission link 102. As an example, in the case of a display panel, depending on where chips are mounted, the channel lengths may be very different, such that the taps for the closest chip to the center of the display panel and those for the chip farthest from the center may be very different. Furthermore, additional connectors between the transmitter and receiver and/or manufacturing variations between different chips and channels, for example, may result in additional loss and changed channel characteristics, which may lead to widely varying tap values.

However, both the resolution and range of the tap values $C_1$ to $C_n$ may be significantly affected by, for example, variation in the manufacturing process of the calibrated DFE 100, variations in the power supply voltage utilized by the calibrated DFE 100 (e.g., due to power supply noise, thermal drifts, and/or the like), and/or changes in the operating temperature of the calibrated DFE 100, which may be collectively referred to as process, voltage, and temperature (PVT) variations. The calibrated DFE 100 corrects for such variations by calibrating the tap values utilized in correcting for signal distortions. In some examples, the calibrated DFE 100 may correct PVT variations as high as about 30% or higher.

Figure 2:
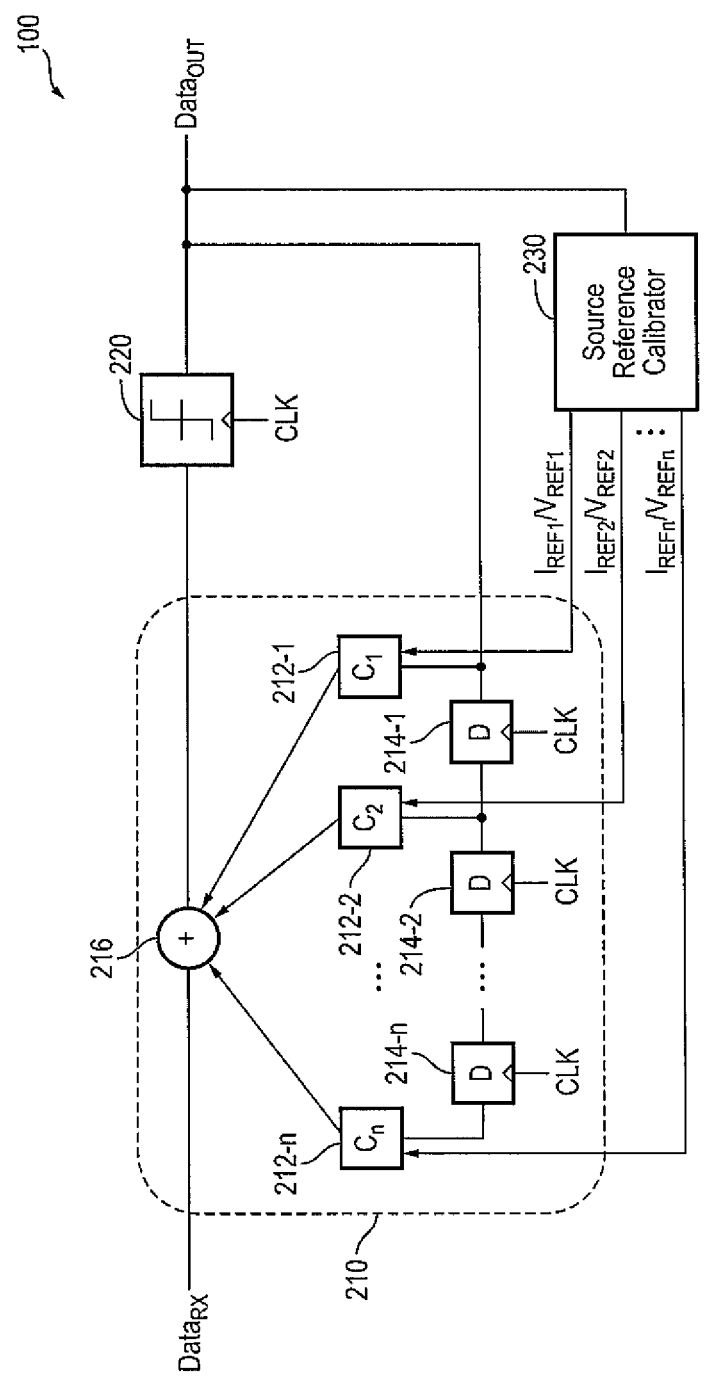
FIG. 2 is a block diagram of the calibrated DFE according to some exemplary embodiments of the present invention.

FIG. 2 is a block diagram of the calibrated DFE 100 according to some exemplary embodiments of the present invention.

Referring to FIG. 2, the calibrated DFE 100 includes an analog front end 210 for filtering (e.g., correcting) a received date $DATA_{RX}$, a sampler (e.g., a slicer) 220 for sampling the filtered received data, and a source reference calibrator 230 for providing a plurality of calibrated reference sources (e.g., calibrated source currents or calibrated source voltages) to calibrate tap values of the analog front end 210. The analog front end 210 includes a plurality of coefficient multipliers (also referred to as DFE taps) 212-1 to 212-n (where n is an integer greater than 1) for multiplying delayed samples by the tap values $C_1$ to $C_n$, respectively. The delayed samples may be provided by a plurality of delay lines 214-1 to 214-(n-1) that delay the sampled signal received from the sampler 220 by a sample period set by a clock signal CLK. The adder 216 sums (or subtracts) the tap values from the incoming signal $DATA_{RX}$ prior to forwarding the corrected signal to the sampler 220, which samples the corrected signal at a regular sample period set by the clock signal CLK.

According to some embodiments, the source reference calibrator 230 calibrates the tap values $C_1$ to $C_n$ by supplying calibrated reference currents $I_{REF1}$, $I_{REF2}$, ..., $I_{REFn}$ to the coefficient multipliers 212-1 to 212-n, respectively, which operate as current multipliers. However, embodiments of the present invention are not limited thereto. For example, the coefficient multipliers 212-1 to 212-n may be voltage multipliers, in which case, the source reference calibrator 230 may calibrate the tap values $C_1$ to $C_n$ by supplying calibrated reference voltages $V_{REF1}$, $V_{REF2}$, ..., $V_{REFn}$ to the coefficient multipliers 212-1 to 212-n, respectively.

While not shown, in some embodiments, the calibrated DFE 100 may include one or more further analog front end circuits preceding the adder 216, which may provide additional equalization before forwarding the corrected signal to the sampler 220.

Figure 3A:
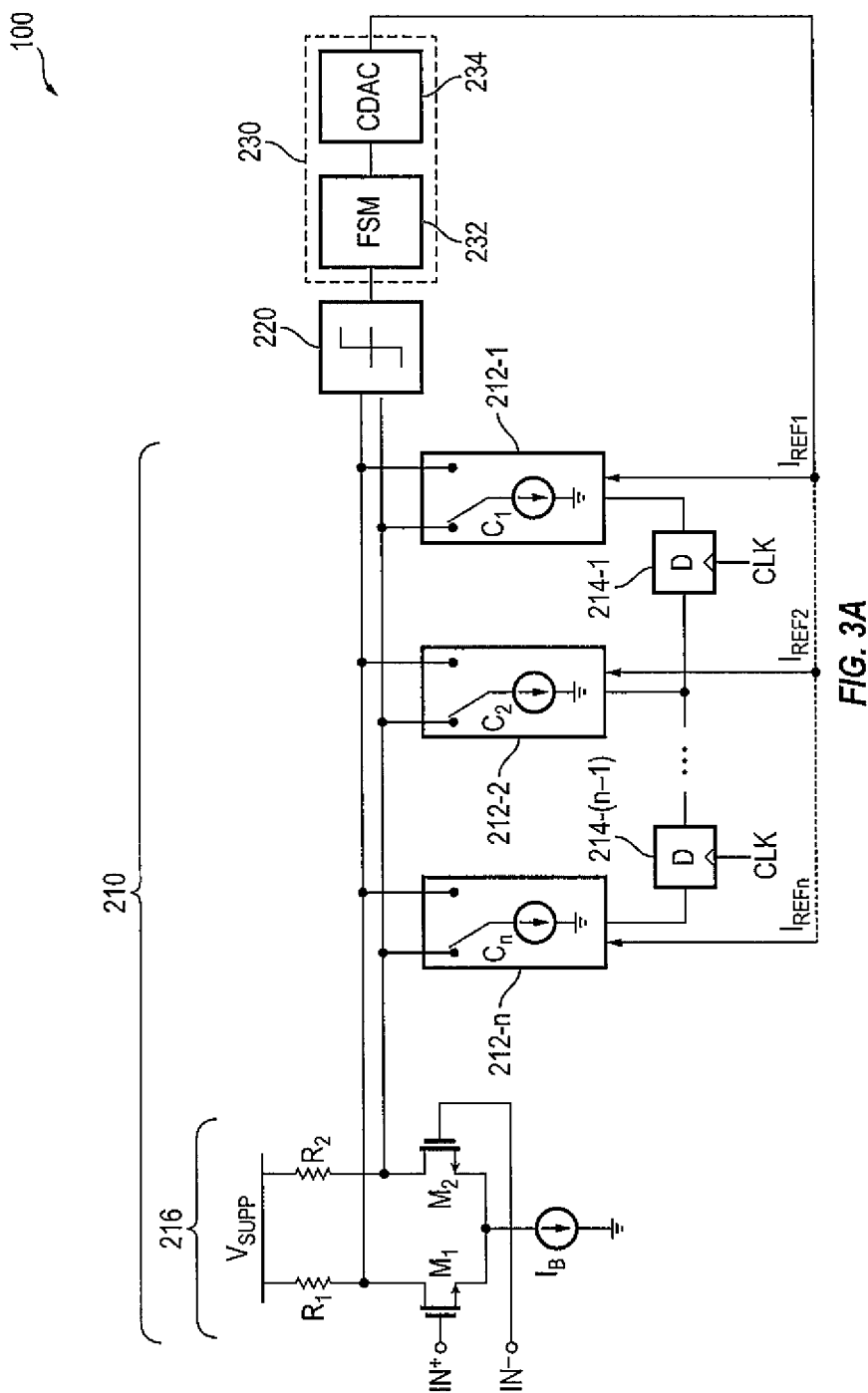
FIGS. 3A-3B are schematic diagrams of the calibrated DFE utilizing current digital-to-analog converters as coefficient multipliers, according to some exemplary embodiments of the present invention.
Figure 3B:
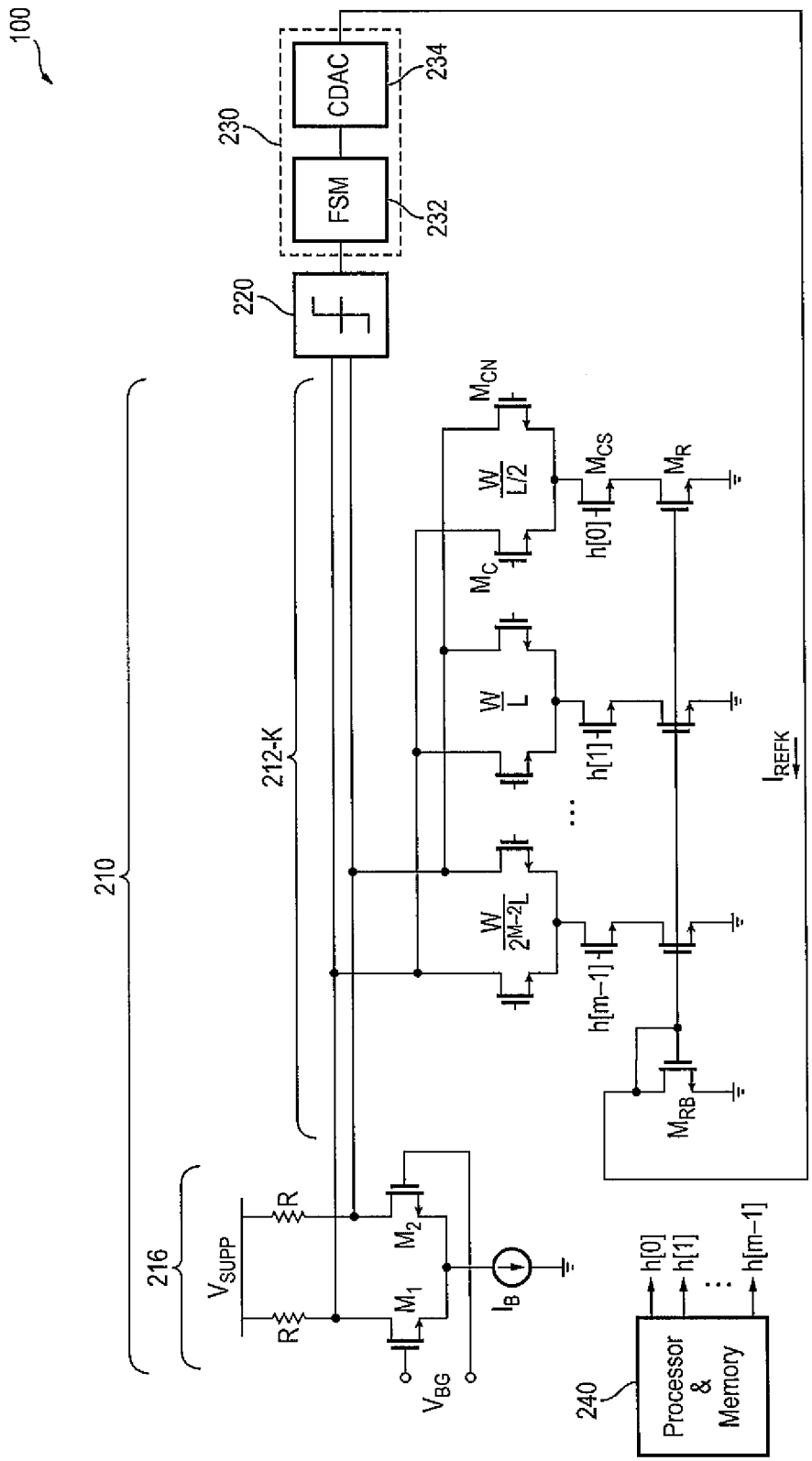

FIGS. 3A-3B are schematic diagrams of the calibrated DFE 100 according to some exemplary embodiments of the present invention. FIGS. 3A-3B illustrate exemplary embodiments of the present invention in which the coefficient multipliers 212-1 to 212-n are implemented as current digital-to-analog converters (CDACs).

Referring to FIG. 3A, the adder 216 may be a differential voltage amplifier including a differential pair of transistors $M_1$ and $M_2$ that are biased through a bias current $I_B$ and are coupled to a supply voltage $V_{SUPP}$ via the resistors $R_1$ and $R_2$, which may have the same resistance value R. The differential pair $M_1$ and $M_2$ may convert an input voltage signal (e.g., the receive signal $DATA_{RX}$) at the differential input IN+ and IN- into a current signal. The coefficient multipliers 212-1 to 212-n, which may be implemented as programmable CDACs coupled to the output of the adder 216, may subtract, from the resulting current signal, current values corresponding to the tap values $C_1$ to $C_n$.

According to some embodiments, the current values subtracted by the coefficient multipliers 212-1 to 212-n are determined by the calibrated reference currents $I_{REF1}$ to $I_{REFn}$ supplied by the source reference calibrator 230.

In some embodiments, each of the coefficient multipliers 212-1 to 212-n is separately calibrated and supplied with a corresponding reference current that may be different from the reference current applied to the other coefficient multipliers. However, embodiments of the present invention are not limited thereto. For instance, in other embodiments, only a representative one of the coefficient multipliers 212-1 to 212-n may be calibrated and the resulting reference current $I_{REF}$ may be applied to all of the coefficient multipliers 212-1 to 212-n. In still other embodiments, a subset of coefficient multipliers 212-1 to 212-n are separately calibrated and a resulting subset of representative reference currents are combined (e.g., averaged) to determine the reference current $I_{REF}$ that is applied to all of the coefficient multipliers 212-1 to 212-n.

According to some embodiments, the source reference calibrator 230 includes at least one pair of a finite state machine (FSM) 232 and a CDAC 234 that generates an output current corresponding to a control code supplied by the FSM 232. For convenience of illustration, FIGS. 3A-3B only show a single pair of FSM 232 and CDAC 234, however, the number of FSM-CDAC pairs may be the same as the number of the coefficient multipliers 212-1 to 212-n that are calibrated. Thus, according to some examples, the source reference calibrator 230 may include n FSM-CDAC pairs.

According to some examples, the sampler 220 may be the low-latency, high-gain, current-mode logic slicer described in U.S. patent application Ser. No. 15/144,521, filed on May 2, 2016, the entire content of which is incorporated herein by reference. However, the sampler 220 may also be any suitable sampler known in the art for sampling high-speed signals.

As shown in FIG. 3B, in some embodiments, a coefficient multiplier 212-k (where 1≤k≤n) includes m branches (where m is an integer greater than 1) each including a cascode transistor $M_{CS}$, a ratio transistor $M_R$, and first and second coefficient transistors $M_C$ and $M_{CN}$ that are coupled together as a differential pair. The control codes h[0] to h[m-1] are applied to the cascode transistors $M_{CS}$ of the m branches, and turn on and off the individual branches. Each branch mirrors a fraction of the calibrated reference current $I_{REFk}$ provided by the source reference calibrator 230 based on the relative characteristics (e.g., channel width and channel length) of the ratio transistors $M_R$ and the base ratio transistor $M_{RB}$. In some examples, the channel lengths of the ratio transistors $M_R$ may be substantially the same, while the channel width of successive ones of the ratio transistors $M_R$ may be successive fractions (which may be less than or greater than 1) of that of the base ratio transistor $M_{RB}$. For example, when the width to length ratio of the ratio transistor $M_R$ and the first and second coefficient transistors $M_C$ and $M_{CN}$ of a 1st branch receiving the control code h[0] is represented as W/2L, the same ratio of the corresponding transistors in the successive branches may be W/L, W/2L, W/4L, and so forth.

While FIG. 3B only illustrates the structure of the coefficient multiplier 212-k for ease of illustration, the remaining plurality of coefficient multipliers 212-1 to 212-n may have a structure that is the same as, or substantially the same as, that of the coefficient multiplier 212-k. Further, while FIG. 3 illustrates an embodiment in which the transistors of the coefficient multiplier 212-k are NMOS field effect transistors (FETS), embodiments of the invention are not limited thereto. For example, as will be recognized by those of ordinary skill in the art, one or more of the transistors of the coefficient multiplier 212-k may be PMOS transistors. For example, all of the transistors of the coefficient multiplier 212-k may be PMOS transistors, in which case the polarity of the voltages/signals applied to the gates of said transistors may be reversed.

While not shown for ease of illustration, the CDAC 234 may have substantially the same structure as that of the coefficient multipliers 212-k but with a suitable number of branches. The control codes of the CDAC 234 may be provided by the FSM 232, which can increase/decrease the output of the CDAC 234 depending on the sampled signal at the sampler 220.

Hereinafter, the tap value calibration process according to some exemplary embodiments is described with reference to FIG. 3B.

When in calibration mode, a preset voltage $V_{BG}$ is applied at the differential input of the adder 216. In some embodiments, the preset voltage $V_{BG}$ is an output of a bandgap voltage reference circuit, which maintains a substantially constant voltage $V_{BG}$ irrespective of power supply variations and temperature changes.

According to some embodiments, in calibration mode, all DFE tap values are set to zero with the exception of the DFE tap under calibration, which is set to maximum value. For example, when the coefficient multiplier 212-k is being calibrated, the control codes applied to it are set to a maximum value to activate (e.g., turn on) all of the branches of the coefficient multiplier 212-k (by turning on the respective cascade transistors), while the control codes applied to the remaining ones of the coefficient multipliers 212-1 to 212-n are set to deactivate (e.g., turn off) the cascade transistors in their respective branches. In the example of FIG. 3B, the control codes h[0] to h[m−1] applied to the coefficient multiplier 212-k are set to a binary '1' (representing a gate-on voltage), which configures the coefficient multiplier 212-k to draw maximum current, and the control codes applied to all remaining coefficient multipliers 212-1 to 212-n are set to a binary '0' (representing a gate-off voltage), which minimizes (e.g., disables) current draw by the remaining coefficient multipliers 212-1 to 212-n.

In some embodiments, when in calibration mode, the FSM 232 controls the CDAC 234 to produce a minimum reference current $I_{REFk}$ by, for example, setting the control code applied to the branches of the CDAC 234 to the lowest value (e.g., all binary '0's). Thereafter, the FSM 232 incrementally increases the CDAC control code to gradually increase the value of reference current $I_{REFk}$ generated by the CDAC 234. As the control codes of the reference current $I_{REFk}$ are being increased, the FSM 232 monitors the output of the sampler 220 to determine when the output of the sampler 220 transitions from a first state to a second state (e.g., transitions from a binary '1' value to a binary '0', or vice versa), and records the source reference $I_{REFk}$ (e.g., the associated CDAC control code) corresponding to the transition as the calibrated reference current (e.g., a first calibrated reference current) for the coefficient multipliers 212-k.

In embodiments in which all of the coefficient multipliers 212-1 to 212-n share the same reference current, the same calibrated reference current $I_{REFk}$ may be used by all of the coefficient multipliers 212-1 to 212-n. However, in embodiments in which the coefficient multipliers 212-1 to 212-n do not share the same reference current, the calibration process outlined above may be separately performed for each of the coefficient multipliers being calibrated.

According to some embodiments, impact of hysteresis in the sampler 220 may be reduced or eliminated by repeating the above calibration process in the opposite direction, and averaging the results from the two processes to determine an averaged calibrated reference current to use during normal operation of the calibrated DFE 100 (e.g., when not in calibration mode). For example, in performing the calibration process in the reverse order, the FSM 232 may initially control the CDAC 234 to produce the highest reference current $I_{REFk}$ by, for example, setting the control code applied to the branches of the CDAC 234 to the highest value (e.g., all binary 1's). Thereafter, the FSM 232 may decrement the CDAC control code to gradually decrease the value of reference current $I_{REFk}$ generated by the CDAC 234. As the control codes of the reference current $I_{REFk}$ are being decreased, the FSM 232 monitors the output of the sampler 220 to determine when the output of the sampler 220 transitions from the second state to the first state (e.g., transitions from a binary '0' value to a binary '1' value, or vice versa), and records the source reference $I_{REFk}$ (e.g., the associated CDAC control code) corresponding to the transition as the second calibrated reference current. The FSM 232 may thereafter use the average of the first and second calibrated reference currents to supply one or more of the coefficient multipliers 212-1 to 212-n during normal operation of the calibrated DFE 100.

As a result, while the resolution and range of the tap values $C_1$ to $C_n$ of the analog front end 210 may be determined by a combination of the resistor R, the reference current $I_{REF}$, and the adder 216 gain, which are all affected by PVT variations, by employing a negative feedback loop and a given preset voltage $V_{BG}$, the calibrated DFE 100 adjusts (e.g., calibrates) the reference current $I_{REF}$ so as to reduce (e.g., minimize) tap value resolution and range variation across PVT corners. Thus, the calibrated DFE 100 enables reliable DFE operation in applications with preset tap values and extends the range of operation.

The calibrated DFE 100 may include a processor and memory 240 that generates and controls the tap values $C_n$ to $C_n$ (e.g., the control codes h[0] to h[m−1] applied to each of the coefficient multipliers 212-1 to 212-n), and applies the preset voltage $V_{BG}$ to the input of the calibrated DFE 100. The functions performed by the processor are according to instructions stored in the memory, which may be local to the processor.

FIGS. 3A-3B illustrate embodiments in which the coefficient multipliers 212-1 to 212-n function as current multipliers and the source reference calibrator 230 includes a current DAC 234; however, embodiments of the present invention are not limited thereto. For instance, in alternative embodiments, the coefficient multipliers 212-1 to 212-n may function as voltage multipliers, in which case, the source reference calibrator 230 may calibrate the tap values $C_1$ to $C_n$ by supplying calibrated reference voltages $V_{REF1}$, $V_{REF2}$, ..., $V_{REFn}$ to the coefficient multipliers 212-1 to 212-$n$, respectively, via a voltage DAC rather than the CDAC 234. In such embodiments, the process of calibrating the coefficient multipliers 212-1 to 212-$n$ is substantially the same as that described above with respect to FIGS. 3A-3B, with the exception that the FSM controls the voltage output from the voltage DAC, rather than current, and records a voltage (or average of voltages) corresponding to the output transition(s) of the sampler 220 as the calibrated source reference.

Figure 4A:
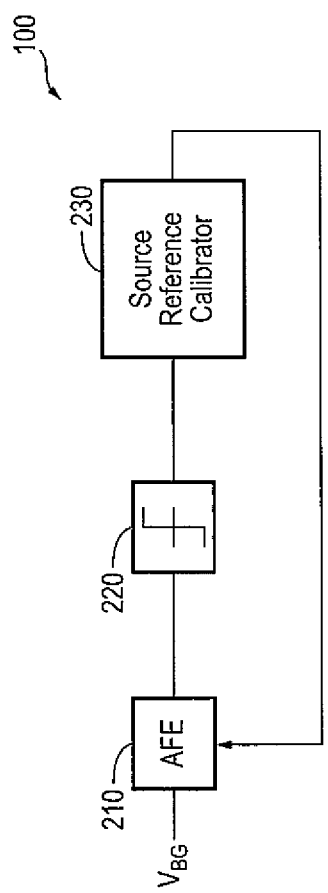
FIGS. 4A-4B are conceptual illustrations of the calibrated DFE utilizing negative feedback to calibrate DFE tap values, according to some exemplary embodiments of the present invention.

FIG. 4A is a conceptual illustration of embodiments of the present invention in which the DFE taps (e.g., the coefficient multipliers 212-1 to 212-$n$) are implemented within an analog front end 210 at an input of the sampler 220; however, embodiments of the present invention are not limited thereto. For example, the calibration process described above with respect to FIGS. 2 and 3A-3B may be applied anywhere that the coefficient multipliers 212-1 to 212-$n$ are located.

Figure 4B:
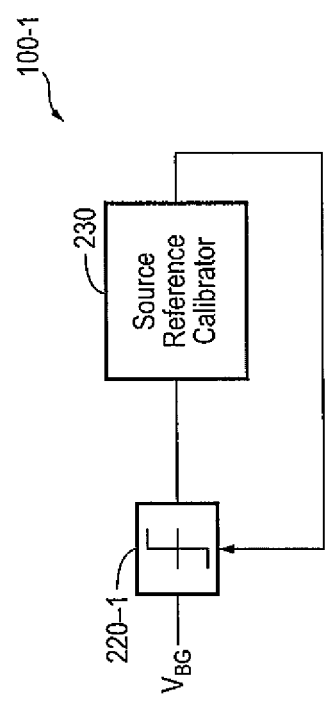

For example, FIG. 4B illustrates embodiments of the present invention in which the coefficient multipliers 212-1 to 212-$n$ are implemented within the sampler 220-1. In such embodiments, the preset voltage $V_{BG}$ is applied to the input of the sampler 220-1, and the negative feedback loop is closed at the sampler 220-1 via the calibrated coefficient multipliers 212-1 to 212-$n$ within it.

According to some embodiments, calibration may be performed at the time of manufacture, at a power on event, periodically at regular time intervals or intervals defined by a number of bits processed, when a temperature of the calibrated DFE 100 changes beyond a predefined range, and/or when a change in supply voltage extends beyond a predefined range.

In some embodiments in which constant and continuous tracking of voltage and temperature variations is desired, a replica loop may be used in which a replica circuit of the calibrated DFE 100/100-1 is continuously connected to the preset voltage $V_{BG}$. In such embodiments, the replica loop may be substantially the same as the calibrated DFE 100/100-1, and the source references (e.g., $I_{REF}$ or $V_{REF}$) resulting from the continuous calibration may be fed to the DFE taps operating on the actual input signal.

Figure 5:
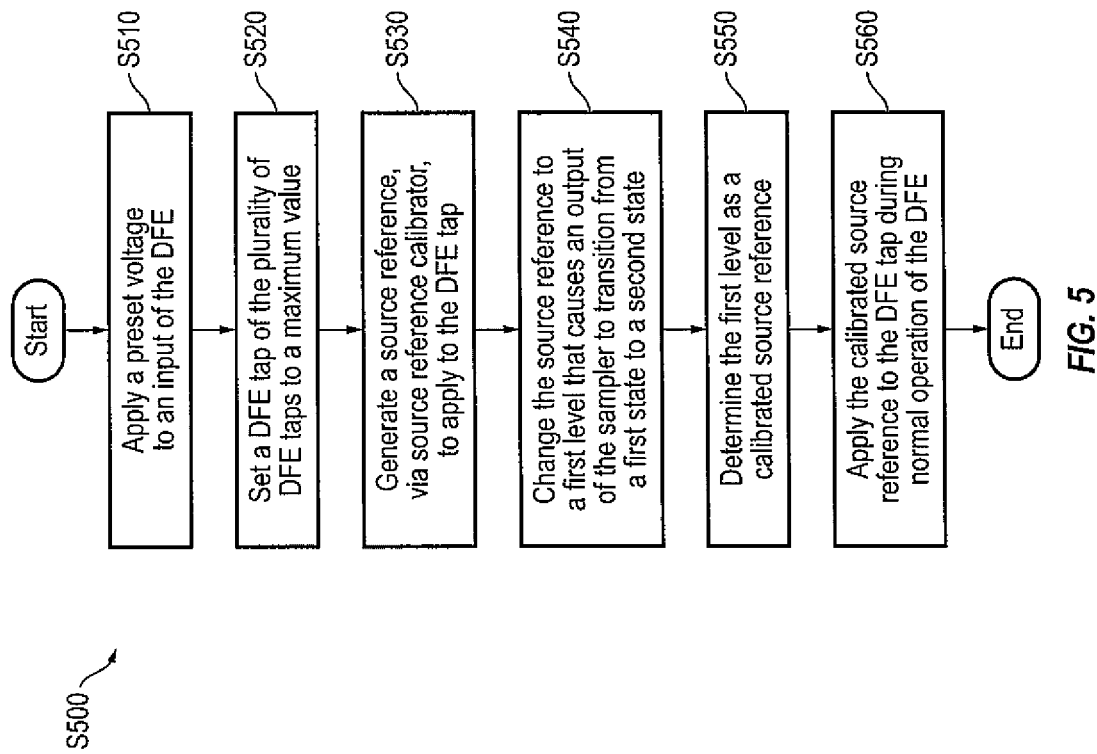
FIG. 5 is a flow diagram illustrating a process for calibrating tap values of a calibrated DFE according to some exemplary embodiments of the present invention.

FIG. 5 is a flow diagram illustrating a process S500 for calibrating DFE tap values of a calibrated DFE 100 according to some exemplary embodiments of the present invention.

In act S510, the processor 240 applies a preset voltage $V_{BG}$ to an input of the calibrated DFE (e.g., an input of the adder 216 or the input of the sampler 220-1). In some embodiments, the preset voltage $V_{BG}$ is a bandgap voltage reference that is substantially constant across a range of PVT variations.

In act S520, the processor 240 sets a DFE tap (e.g., the coefficient multiplier 212-$k$) of the plurality of DFE taps (e.g., the coefficient multipliers 212-1 to 212-$n$) to a maximum value, and sets all other of the plurality of DFE taps to zero (e.g., disables all other DFE taps).

In act S530, the source reference calibrator 230 generates a source reference to apply to the DFE tap (e.g., the coefficient multiplier 212-$k$). In some embodiments, the source reference is a minimum (or maximum) reference current. In alternative embodiments, the source reference may be a minimum (or maximum) reference voltage.

In act S540, the source reference calibrator 230 changes (e.g., incrementally increases or decreases) the source reference to a first level (e.g., a transition level) that causes an output of the sampler 220 to transition from a first state to a second state (e.g., causes the sampler 220 output to transition from a binary '1' value to a binary '0', or vice versa). In some embodiments, the source reference calibrator 230 gradually increments/decrements the reference current $I_{REF}$ supplied to the DFE tap from the minimum/maximum reference current to the first level. In alternative embodiments, the source reference calibrator 230 gradually increments/decrements the reference voltage $V_{REF}$ supplied to the DFE tap from the minimum/maximum reference voltage to the first level.

In act S550, the source reference calibrator 230 determines the first level as a calibrated source reference, and in act 560, the source reference calibrator 230 applies the calibrated source reference to the DFE tap during normal operation of the DFE (e.g., when not in calibration mode).

According to the above, the calibrated DFE 100/100-1 reduces or eliminates sensitivity of tap resolution and range to PVT variations, which enhances ability to operate across multiple channels, lowers overall system complexity, improves manufacturing yield, and lowers cost.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

It will be understood that when an element or layer is referred to as being "on," "connected to," "coupled to," or "adjacent" another element or layer, it can be directly on, connected to, coupled to, or adjacent the other element or layer, or one or more intervening elements or layers may be present. When an element or layer is referred to as being "directly on," "directly connected to," "directly coupled to," or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

The calibrated DFE and/or any other relevant devices or components according to embodiments of the present invention described herein may be implemented utilizing any suitable hardware, firmware (e.g., an application-specific integrated circuit), software, or a suitable combination of software, firmware, and hardware. For example, the various components of the calibrated DFE may be formed on one integrated circuit (IC) chip or on separate IC chips. Further, the various components of the calibrated DFE may be implemented on a flexible printed circuit film, a tape carrier package (TCP), a printed circuit board (PCB), or formed on the same substrate. Further, the various components of the calibrated DFE may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

What is claimed is:

1. A method of calibrating coefficients of a calibrated decision feedback equalizer (DFE) across a process, voltage, and temperature (PVT) range, the calibrated DFE comprising a plurality of DFE taps for reducing distortions of an input signal, and a sampler for sampling the input signal, the method comprising:
    applying a preset voltage to an input of the calibrated DFE;
    setting a DFE tap of the plurality of DFE taps to a maximum value;
    generating a source reference, via a source reference calibrator, to apply to the DFE tap;
    changing the source reference to a first level that causes an output of the sampler to transition from a first state to a second state;
    determining the first level as a calibrated source reference; and
    applying the calibrated source reference to the DFE tap during normal operation of the calibrated DFE.

2. The method of claim 1, further comprising setting all other of the plurality of DFE taps to zero.

3. The method of claim 1,
    wherein the source reference is a minimum reference current, and
    wherein the changing the source reference to the first level comprises incrementing a current applied to the DFE tap from the minimum reference current to the first level.

4. The method of claim 3, further comprising:
    generating a maximum reference current, via the source reference calibrator, to apply to the DFE tap;
    decrementing the current applied to the DFE tap from the maximum reference current to a second level that causes an output of the sampler to transition from the second state to the first state; and
    determining the calibrated source reference as an average of the first and second levels.

5. The method of claim 1,
    wherein the source reference is a maximum reference current, and
    wherein the changing the source reference to the first level comprises decrementing a current applied to the DFE tap from the maximum reference current to the first level.

6. The method of claim 5, further comprising:
    generating the maximum reference current, via the source reference calibrator, to apply to the DFE tap;
    incrementing the current applied to the DFE tap from the maximum reference current to a second level that causes an output of the sampler to transition from the second state to the first state; and
    determining the calibrated source reference as an average of the first and second levels.

7. The method of claim 1, wherein the preset voltage is a bandgap voltage reference that is constant across the PVT range.

8. The method of claim 1, wherein the first and second states correspond to different binary logic states.

9. The method of claim 1,
    wherein the source reference is a minimum reference voltage, and
    wherein the changing the source reference to the first level comprises incrementing a voltage applied to the DFE tap from the minimum reference voltage to the first level.

10. The method of claim 1,
    wherein the source reference is a maximum reference voltage, and
    wherein the changing the source reference to the first level comprises decrementing a voltage applied to the DFE tap from the maximum reference voltage to the first level.

11. A calibrated decision feedback equalizer (DFE) comprising:
    a sampler configured to sample an input signal received by the calibrated DFE;
    a plurality of DFE taps configured to reduce distortions of the input signal based on an output of the sampler;
    a processor; and
    a processor memory local to the processor, wherein the processor memory has stored thereon instructions that, when executed by the processor, cause the processor to perform:
        applying a preset voltage to an input of the calibrated DFE;
        setting a DFE tap of the plurality of DFE taps to a maximum value;
        generating a source reference, via a source reference calibrator, to apply to the DFE tap;
        changing the source reference to a first level that causes an output of the sampler to transition from a first state to a second state;
        determining the first level as a calibrated source reference; and
        applying the calibrated source reference to the DFE tap during normal operation of the calibrated DFE.

12. The calibrated DFE of claim 11, wherein the instructions further cause the processor to perform setting all other of the plurality of DFE taps to zero.

13. The calibrated DFE of claim 11,
wherein the source reference is a minimum reference current, and
wherein the changing the source reference to the first level comprises incrementing a current applied to the DFE tap from the minimum reference current to the first level.

14. The calibrated DFE of claim 13, wherein the instructions further cause the processor to perform:
generating a maximum reference current, via the source reference calibrator, to apply to the DFE tap;
decrementing the current applied to the DFE tap from the maximum reference current to a second level that causes an output of the sampler to transition from the second state to the first state; and
determining the calibrated source reference as an average of the first and second levels.

15. The calibrated DFE of claim 11,
wherein the source reference is a maximum reference current, and
wherein the changing the source reference to the first level comprises decrementing a current applied to the DFE tap from the maximum reference current to the first level.

16. The calibrated DFE of claim 15, wherein the instructions further cause the processor to perform:
generating a maximum reference current, via the source reference calibrator, to apply to the DFE tap;
incrementing the current applied to the DFE tap from the maximum reference current to a second level that causes an output of the sampler to transition from the second state to the first state; and
determining the calibrated source reference as an average of the first and second levels.

17. The calibrated DFE of claim 11, wherein the preset voltage is a bandgap voltage reference that is constant across a process, voltage, and temperature (PVT) range.

18. The calibrated DFE of claim 11, wherein the first and second states correspond to different binary logic states.

19. A calibrated decision feedback equalizer (DFE) comprising:
a sampler configured to sample an input signal received by the calibrated DFE;
a plurality of DFE taps configured to reduce distortions of the input signal based on an output of the sampler;
a source reference calibrator configured to provide a calibrated source reference to the plurality of DFE taps to reduce sensitivity to process, supply voltage, and temperature variations at the plurality of DFE taps;
a processor; and
a processor memory local to the processor, wherein the processor memory has stored thereon instructions that, when executed by the processor, cause the processor to perform:
applying a preset voltage to an input of the DFE;
setting a DFE tap of the plurality of DFE taps to a maximum value;
generating a source reference, via the source reference calibrator, to apply to the DFE tap;
changing the source reference to a first level that causes an output of the sampler to transition from a first state to a second state;
determining the first level as the calibrated source reference; and
applying the calibrated source reference to the DFE tap during normal operation of the DFE.

20. The calibrated DFE of claim 19, wherein the source reference calibrator comprises:
a finite state machine configured to monitor the output of the sampler, and to generate a control signal based on the monitored output; and
a current digital-to-analog converter (CDAC) configured to generate the calibrated source reference according to the control signal.

* * * * *